(12) United States Patent
Sanders, Jr.

(10) Patent No.: US 11,670,192 B2
(45) Date of Patent: Jun. 6, 2023

(54) MOBIUS ZIPPER INTERACTIVE TEACHING AND LEARNING DEVICE

(71) Applicant: Douglas O. Sanders, Jr., Grand Marais, MN (US)

(72) Inventor: Douglas O. Sanders, Jr., Grand Marais, MN (US)

( * ) Notice: Subject to any disclaimer, the term of this patent is extended or adjusted under 35 U.S.C. 154(b) by 130 days.

(21) Appl. No.: 17/060,034

(22) Filed: Sep. 30, 2020

(65) Prior Publication Data

US 2022/0101753 A1    Mar. 31, 2022

(51) Int. Cl.
*G09B 23/04* (2006.01)
*A44B 19/34* (2006.01)

(52) U.S. Cl.
CPC .............. *G09B 23/04* (2013.01); *A44B 19/34* (2013.01)

(58) Field of Classification Search
CPC ................................ G09B 23/04; A44B 19/34
See application file for complete search history.

(56) References Cited

U.S. PATENT DOCUMENTS

| | | | | |
|---|---|---|---|---|
| 3,758,981 A * | 9/1973 | Hlasnicek | ............ | A63F 7/3622 273/109 |
| 3,806,126 A * | 4/1974 | Gilbert | .................. | A63F 9/0076 273/287 |
| 3,991,631 A * | 11/1976 | Kapp | ........................ | F16G 1/00 474/200 |
| 4,042,244 A * | 8/1977 | Kakovitch | ............ | A63F 7/3622 273/109 |
| 4,058,022 A * | 11/1977 | Pickburn | ................... | F16G 3/00 474/200 |
| 4,384,717 A * | 5/1983 | Morris | ...................... | A63F 9/08 446/490 |
| 4,492,006 A * | 1/1985 | Ishii | ....................... | A44B 19/34 383/103 |
| 4,640,029 A * | 2/1987 | Hornblad | ................ | G09F 11/26 40/518 |
| 5,324,037 A * | 6/1994 | Greeson | .................. | A63F 9/088 273/157 R |
| 5,624,388 A * | 4/1997 | Lehr | ...................... | A61F 5/0118 602/20 |
| 6,138,881 A * | 10/2000 | Paul | ........................ | A45F 3/14 224/645 |
| 11,097,800 B1 * | 8/2021 | Trentacosta | ............... | B62J 9/26 |
| 11,304,501 B1 * | 4/2022 | Doan | ..................... | A44B 19/34 |

* cited by examiner

*Primary Examiner* — Robert Sandy
*Assistant Examiner* — Louis A Mercado
(74) *Attorney, Agent, or Firm* — Cygnet IP Law, P.A.; Stephen W. Aycock, II

(57) ABSTRACT

A mobius zipper learning model is described. The learning model can include a device comprising two 3D printed, hard plastic, semi-circular halves connected by a plastic zipper, which could also be 3D printed, with top ends connected to the frame halves. The zipper can be twisted and then reconnected at the bottom of the frames using embedded fasteners (e.g., hook and eyelet, snaps, or hook and loop). The Mobius zipper permits topologists and others to explore and demonstrate Mobius properties without having to seek and size workable material (usually paper) and/or successfully slice the selected material. Further, use of the Mobius Zipper results in no waste of material.

4 Claims, 8 Drawing Sheets

MOBIUS ZIPPER INTERACTIVE TEACHING AND LEARNING DEVICE

FIELD

Some implementations relate generally to a device which allows to preferably explain and demonstrate three-dimensional objects, e.g. mobius surfaces.

BACKGROUND

The discovery of the Mobius strip in the mid-19th century launched a new field of mathematics: topology. The Mobius strip has only one surface and one boundary. For example, a Mobius strip can be created by taking a strip of paper, twisting it 90 degrees and attaching the ends of the strip with tape (see, e.g., FIG. 1). An unexpected outcome occurs when cutting the strip in half. Instead of yielding two strips. A longer, thinner Mobius strip occurs (see, e.g., FIG. 2). Twisting the original strip 180 degrees or even more and then cutting will occur in two or more connected mobius strips as in a chain.

Typically, mathematicians researching or describing Mobius properties have: 1) used prolific amounts of material, usually paper; 2) been challenged with appropriate slicing of the material; and 3) wrestled with material entanglements and waste.

Embodiments were conceived in light of the above-mentioned problems and limitations, among other things.

SUMMARY

Some implementations can include a mobius zipper learning model comprising a first arcuate section having a first end and a second end, a second arcuate section having a first end and a second end, a first zipper side having a first end and a second end, wherein the first end of the first zipper side is attached to the first end of the first arcuate section, a second zipper side having a first end and a second end, wherein the first end of the second zipper side is attached to the first end of the second arcuate section, a first portion of a first fastener, wherein the first portion of the first fastener is disposed on the second end of the first zipper side, a first portion of a second fastener, wherein the first portion of the second fastener is disposed on the second end of the second zipper side, a second portion of a first fastener, wherein the second portion of the first fastener is disposed on the second end of the first arcuate section, a second portion of a second fastener, wherein the second portion of the second fastener is disposed on the second end of the second arcuate section, and a zipper slider configured to zip and unzip the first zipper side and the second zipper side.

In some implementations, the first fastener and the second fastener are hook and eyelet fasteners, wherein the first portion of the first fastener and the first portion of the second fastener each include an eyelet, and wherein the second portion of the first fastener and the second portion of the second fastener each include a hook.

In some implementations, the first fastener and the second fastener are snap fasteners, wherein the first portion of the first fastener and the first portion of the second fastener each include a stud, and wherein the second portion of the first fastener and the second portion of the second fastener each include a socket.

In some implementations, the first fastener and the second fastener are hook and eyelet fasteners, wherein the first portion of the first fastener and the first portion of the second fastener each include a respective loop material portion, and wherein the second portion of the first fastener and the second portion of the second fastener each include a respective hook material portion.

DETAILED DESCRIPTION

Some implementations can include using 3D printing (or other suitable manufacturing techniques such as injection molding) to manufacture arcuate (or curved) portions of a Mobius Zipper (MZ) learning model. The Mobius Zipper learning model can provide manageable usages in topology research, topology education and teaching. The disclosed Mobius Zipper is a reusable learning model and provides numerous advantages over conventional Mobius strip models (e.g., paper strips) including elimination of inaccurate "strip" slicing, interpretation of twisted results, and wasted material.

Some implementations can include a device comprising two 3D printed, hard plastic, semi-circular halves connected by a plastic zipper, which could also be 3D printed, with top ends connected to the frame halves. The zipper can be twisted and then reconnected at the bottom of the frames using embedded fasteners (e.g., hook and eyelet, snaps, or hook and loop).

The Mobius zipper permits topologists and others to explore and demonstrate Mobius properties without having to seek and size workable material (usually paper) and/or successfully slice the selected material. Further, use of the Mobius Zipper results in no waste of material.

Figure 1:
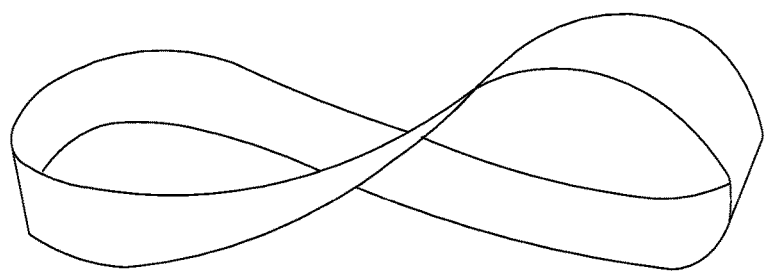
FIG. 1 is a diagram of a Mobius strip.
Figure 2:
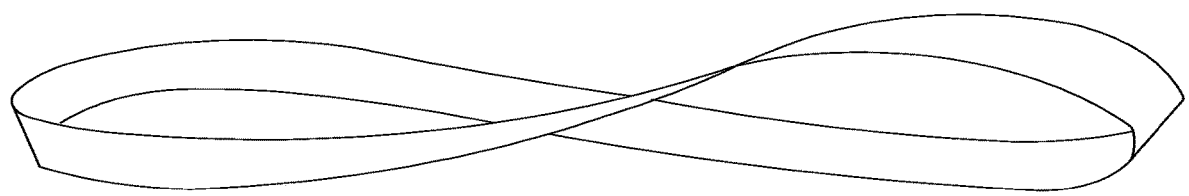
FIG. 2 is a diagram of Mobius strip.
Figure 3:
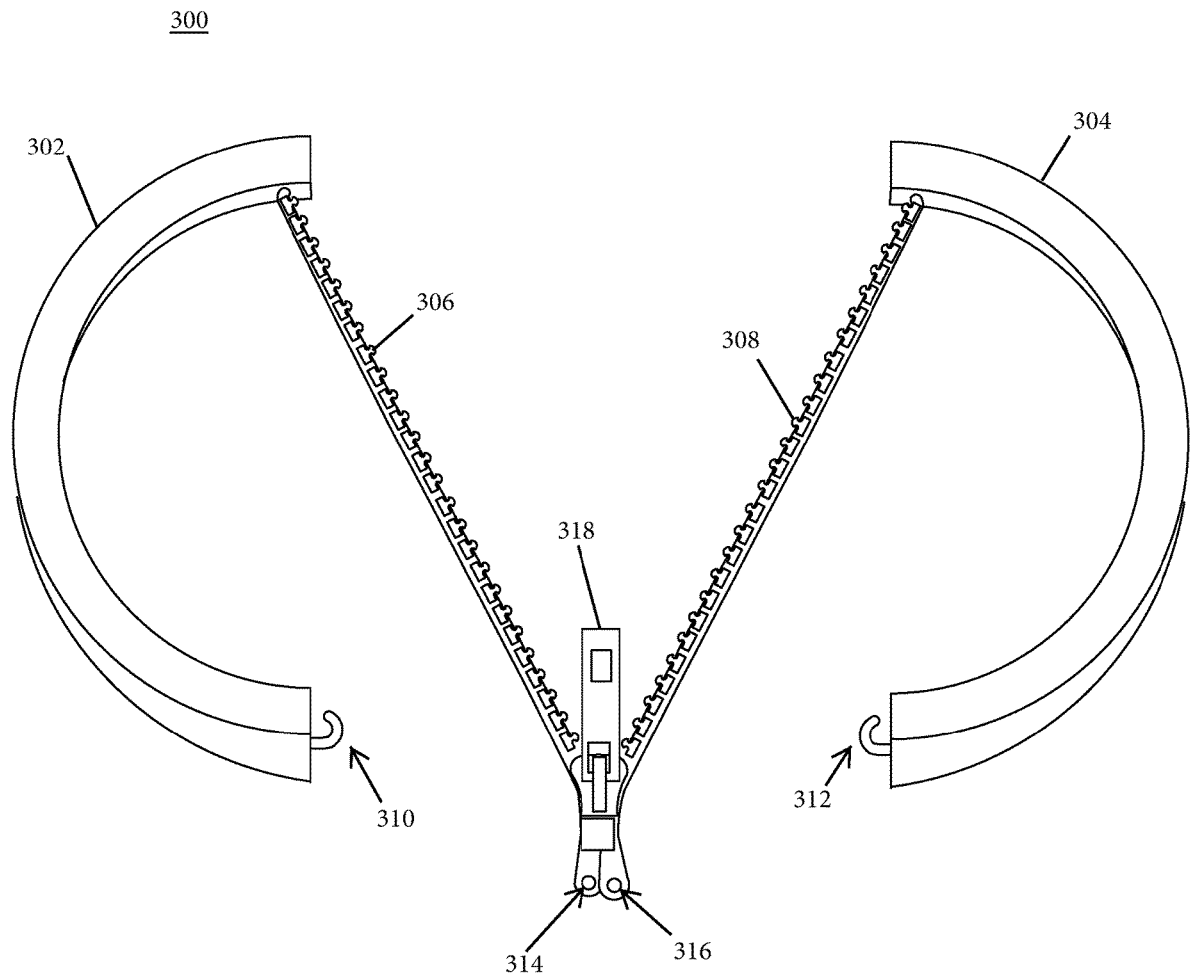
FIG. 3 is diagram of an example mobius zipper learning model having hook and eyelet fasteners in accordance with some implementations.

FIG. 3 is diagram of an example mobius zipper learning model 300 having hook and eyelet fasteners in accordance with some implementations. The mobius zipper learning model 300 includes a first arcuate section 302, a second arcuate section 304, a first zipper side 306, a second zipper side 308, a first hook 310, a second hook 312, a first eyelet 314, a second eyelet 316, and a zipper slider 318. Each zipper side has a first end attached to a corresponding one of the arcuate sections and a respective eyelet attached to (or disposed at) the second end of each zipper side. Each arcuate section has a corresponding hook attached to (or disposed at) an end opposite the end attached to the zipper side.

In operation, the two zipper sides (306 and 308) can be releasably joined together using the zipper slider 318 in accordance with typical zipper operation. The first hook 310 is configured to releasably attach to the first eyelet 314, and the second hook 312 is configured to releasably attach to the second eyelet 316.

Figure 4:
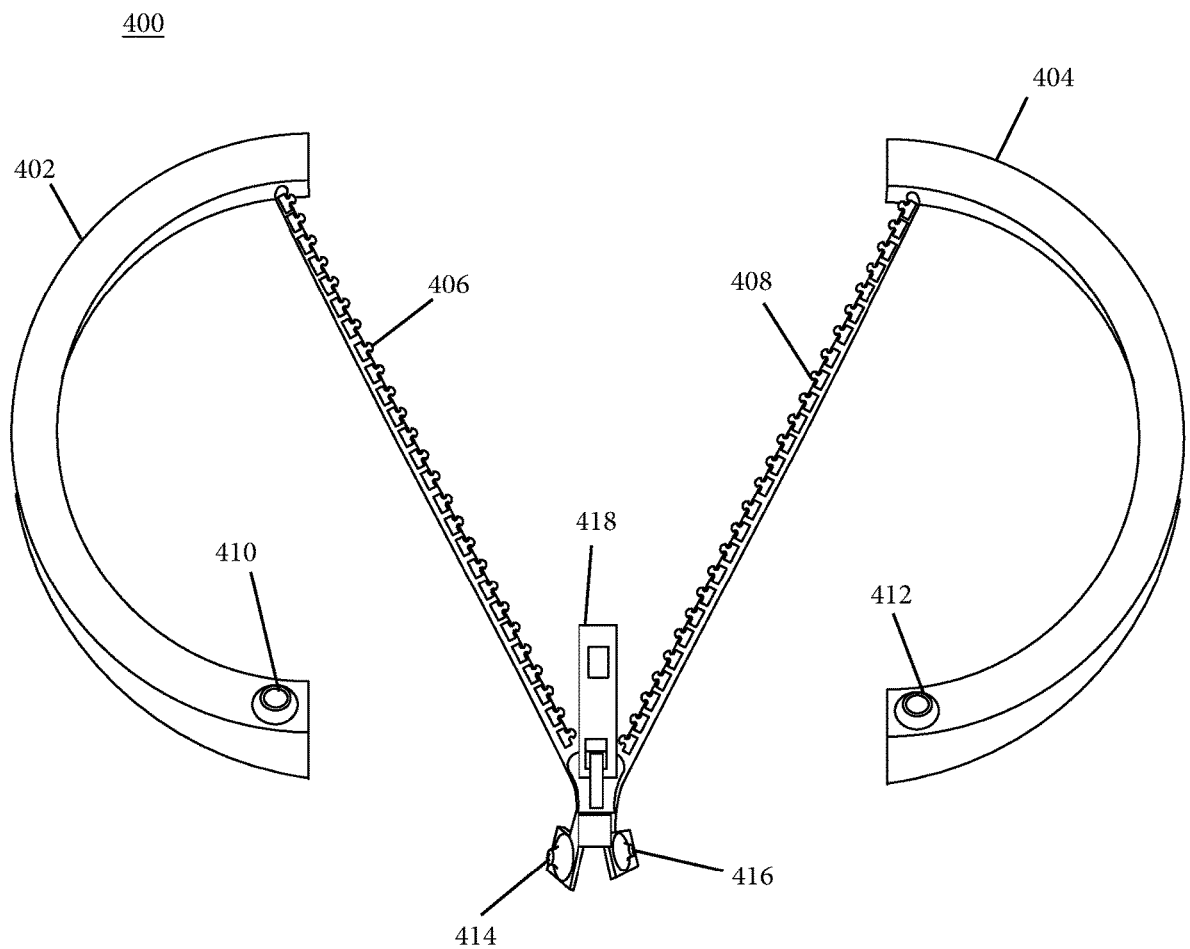
FIG. 4 is diagram of an example mobius zipper learning model having snap fasteners in accordance with some implementations.

FIG. 4 is diagram of an example mobius zipper learning model 400 having snap fasteners in accordance with some implementations. Each snap fastener includes a stud and a socket configured to be snapped together and unsnapped. The mobius zipper learning model 400 includes a first arcuate section 402, a second arcuate section 404, a first zipper side 406, a second zipper side 408, a first socket 410, a second socket 412, a first stud 414, a second stud 416, and a zipper slider 418. Each zipper side has a first end attached to a corresponding one of the arcuate sections and a respective stud attached to (or disposed at) the second end of each zipper side. Each arcuate section has a corresponding socket attached to (or disposed at) an end opposite the end attached to the zipper side.

In operation, the two zipper sides (406 and 408) can be releasably joined together using the zipper slider 418 in accordance with typical zipper operation. The first socket 410 is configured to releasably attach to the first stud 414, and the second socket 412 is configured to releasably attach to the second stud 416.

Figure 5:
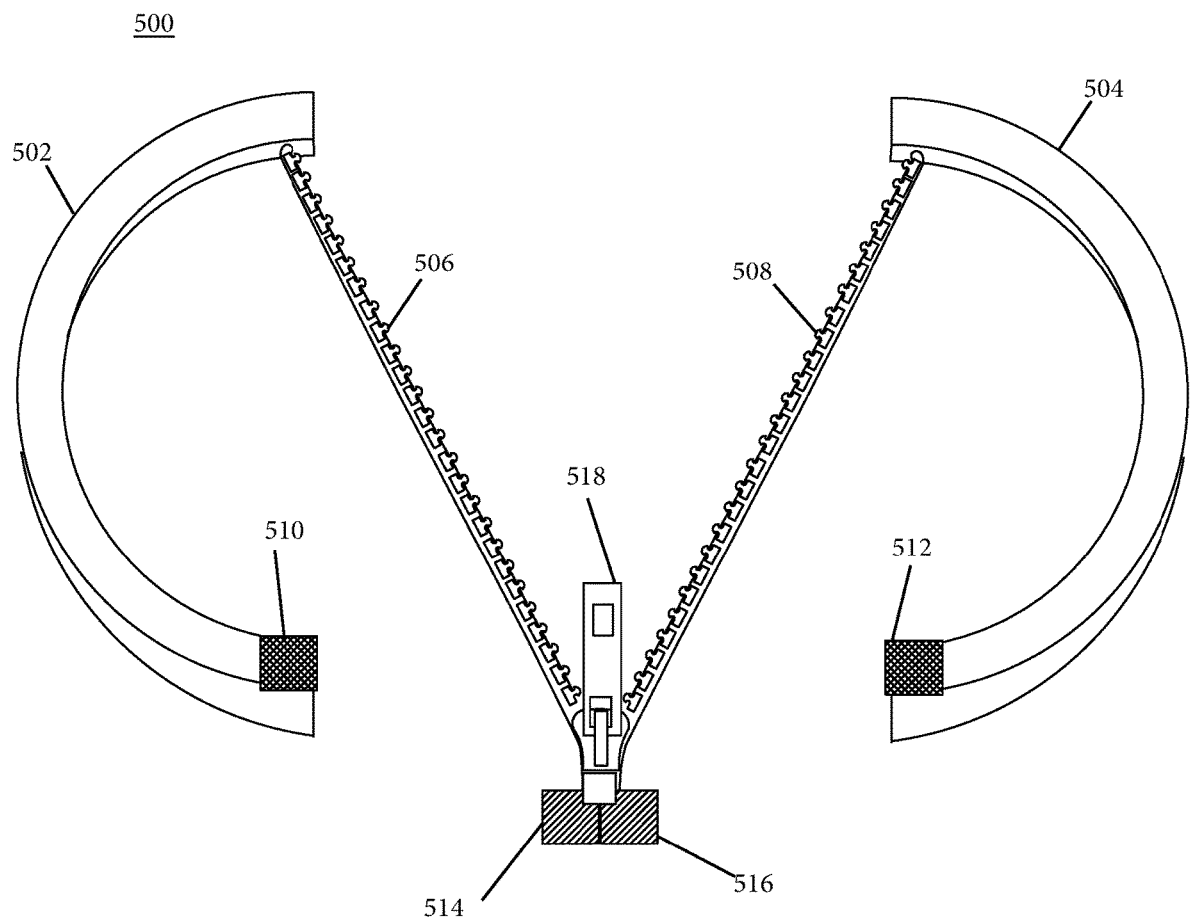
FIG. 5 is diagram of an example mobius zipper learning model having hook and loop fasteners in accordance with some implementations.

FIG. 5 is diagram of an example mobius zipper learning model 500 having hook and loop fasteners in accordance with some implementations. The mobius zipper learning model 500 includes a first arcuate section 502, a second arcuate section 504, a first zipper side 506, a second zipper side 508, a first hook material portion 510, a second hook material portion 512, a first loop material portion 514, a second loop material portion 516, and a zipper slider 518. Each zipper side has a first end attached to a corresponding one of the arcuate sections and a respective loop material portion attached to (or disposed at) the second end of each zipper side. Each arcuate section has a corresponding hook material portion attached to (or disposed at) an end opposite the end attached to the zipper side.

In operation, the two zipper sides (506 and 508) can be releasably joined together using the zipper slider 518 in accordance with typical zipper operation. The first hook material portion 610 is configured to releasably attach to the first loop material portion 514, and the second hook material portion 512 is configured to releasably attach to the second loop material portion 516.

Figure 6:
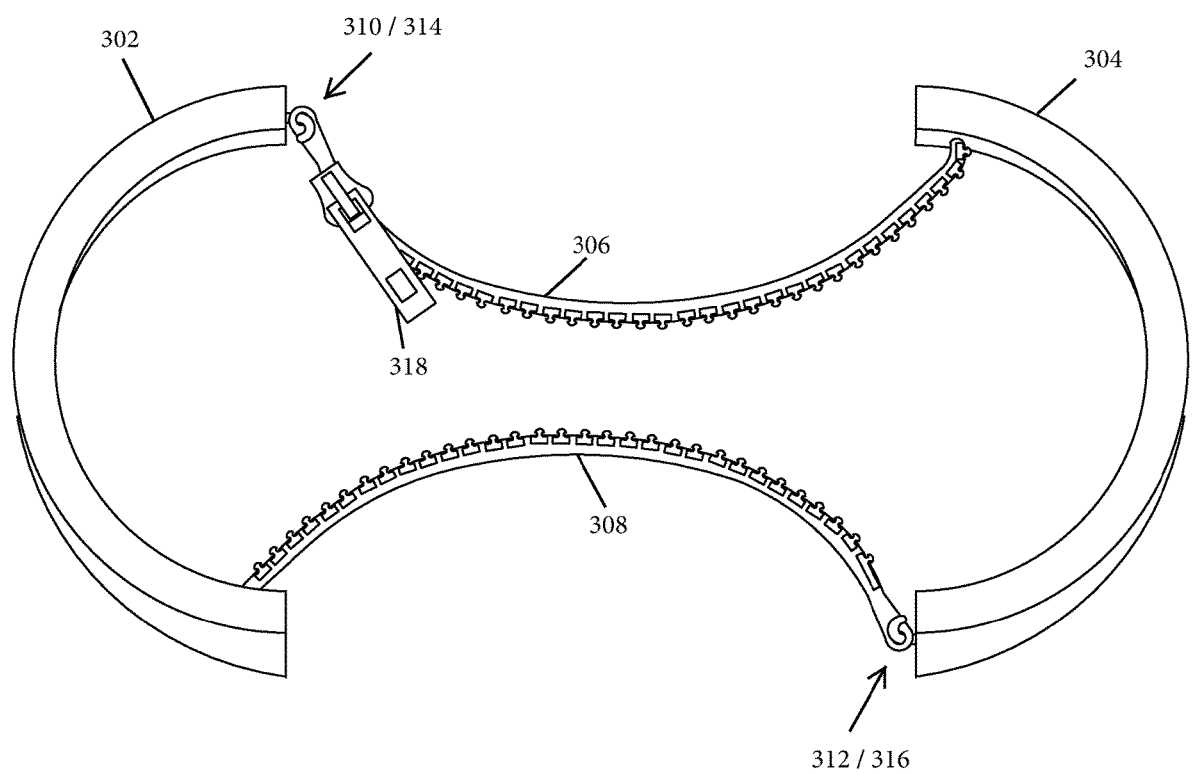
FIG. 6 is a diagram of an example mobius zipper learning model with the zipper ends attached and the zipper undone in accordance with some implementations.

FIG. 6 is a diagram of an example mobius zipper learning model 300 with the zipper ends attached and the zipper undone in accordance with some implementations.

Figure 7:
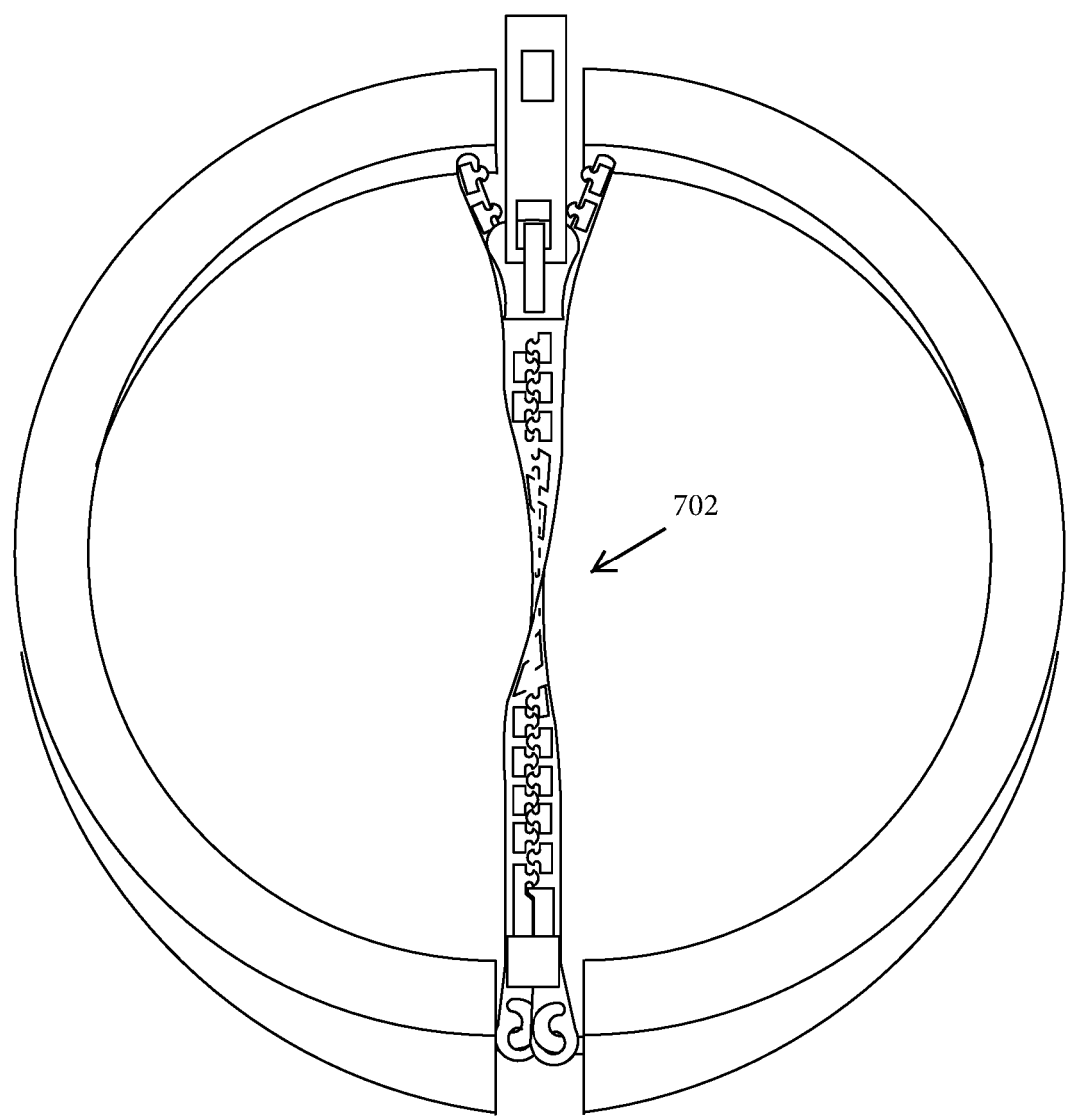
FIG. 7 is a diagram of an example mobius zipper learning model with the zipper ends attached and a single twist in the zipper section in accordance with some implementations.

FIG. 7 is a diagram of an example mobius zipper learning model with the zipper ends attached and a half turn 702 in the zipper section in accordance with some implementations. In particular, FIG. 7 shows the zipper twisted one half turn (e.g., 90 degrees). The top of the device has ends of the zipper attached permanently to the arcuate sections. The bottom of the device has the closed zipper attached by hook and eyelet fastening system.

Figure 8:
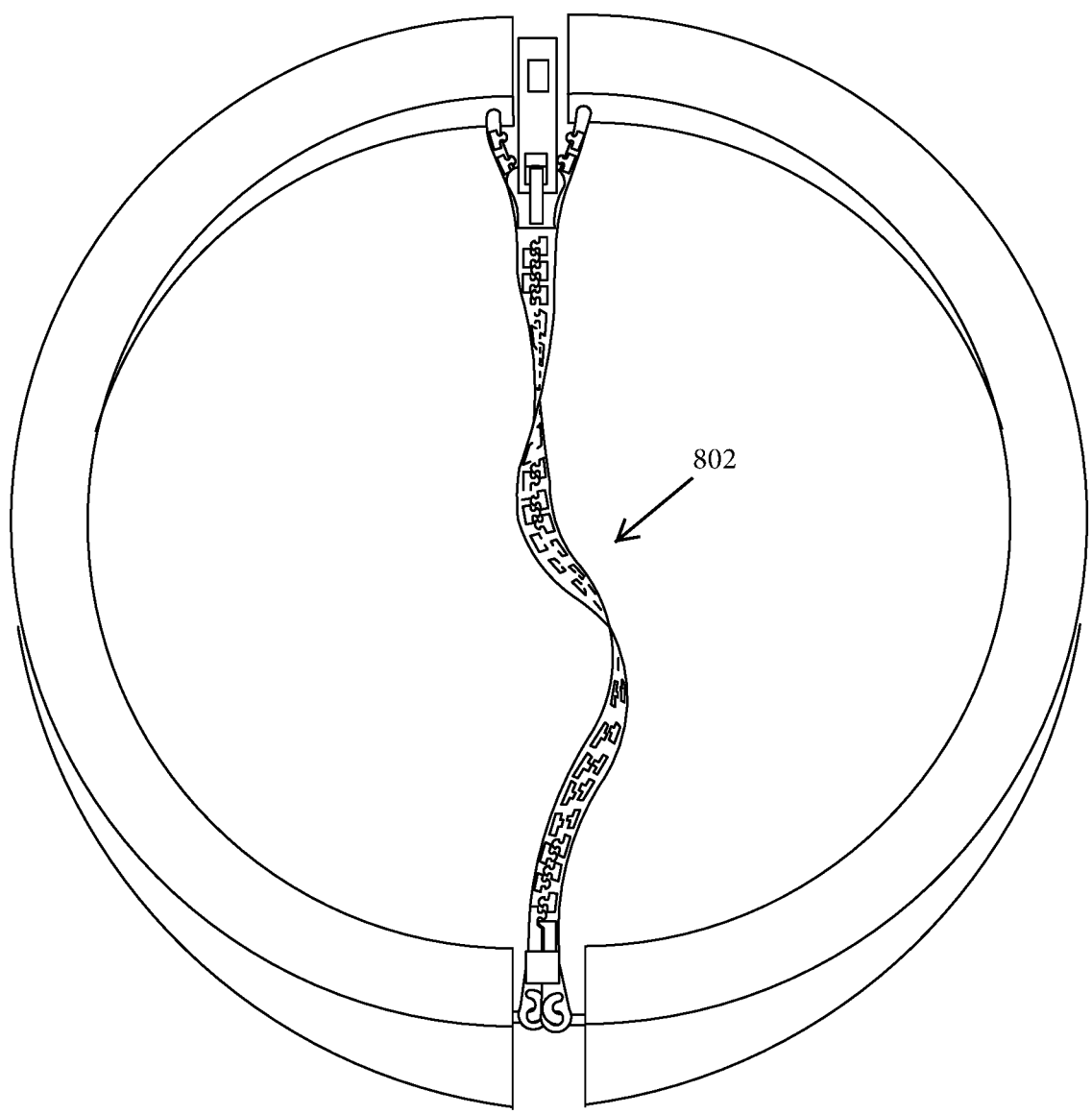
FIG. 8 is a diagram of an example mobius zipper learning model with the zipper ends attached and a double twist in the zipper section in accordance with some implementations.

FIG. 8 is a diagram of an example mobius zipper learning model with the zipper ends attached and the zipper twisted two half turns (e.g., 180 degrees) at 802.

Figure 9:
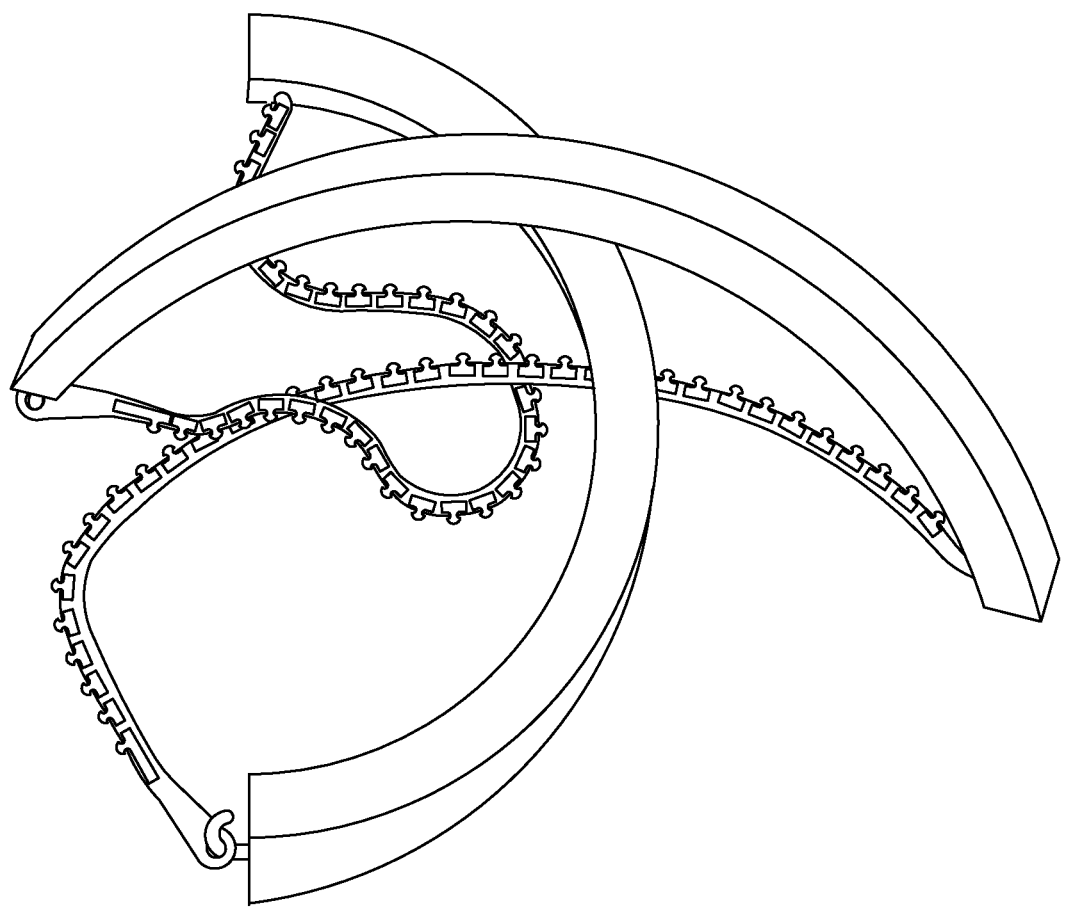
FIG. 9 is a diagram of an example mobius zipper learning model with the zipper ends attached and the zipper undone with the two sides chained together in accordance with some implementations.

FIG. 9 is a diagram of an example mobius zipper learning model as shown in FIG. 8 (e.g., with the two half turns) unzipped. Result is interlocking MK half sizes as in a chain. Each side remains Mobius (i.e., having one surface).

While some implementations have been described in terms of a general embodiment with several specific modifications, it is recognized that persons skilled in this art will readily perceive many other modifications and variations of the embodiments described above within the spirit and scope of the disclosed subject matter. Applicant intends to embrace any and all such modifications, variations and embodiments.

What is claimed is:

1. A mobius zipper learning model comprising:
   a first arcuate section having a first end and a second end;
   a second arcuate section having a first end and a second end;
   a first zipper side having a first end and a second end, wherein the first end of the first zipper side is attached to the first end of the first arcuate section;
   a second zipper side having a first end and a second end, wherein the first end of the second zipper side is attached to the first end of the second arcuate section;
   a first portion of a first fastener, wherein the first portion of the first fastener is disposed on the second end of the first zipper side;
   a first portion of a second fastener, wherein the first portion of the second fastener is disposed on the second end of the second zipper side;
   a second portion of the first fastener, wherein the second portion of the first fastener is disposed on the second end of the first arcuate section;
   a second portion of the second fastener, wherein the second portion of the second fastener is disposed on the second end of the second arcuate section; and
   a zipper slider configured to zip and unzip the first zipper side and the second zipper side.

2. The mobius zipper learning model of claim 1, wherein the first fastener and the second fastener are hook and eyelet fasteners, wherein the first portion of the first fastener and the first portion of the second fastener each include the eyelet, and wherein the second portion of the first fastener and the second portion of the second fastener each include the hook.

3. The mobius zipper learning model of claim 1, wherein the first fastener and the second fastener are snap fasteners, wherein the first portion of the first fastener and the first portion of the second fastener each include a stud, and wherein the second portion of the first fastener and the second portion of the second fastener each include a socket.

4. The mobius zipper learning model of claim 1, wherein the first fastener and the second fastener are hook and loop fasteners, wherein the first portion of the first fastener and the first portion of the second fastener each include a respective loop material portion, and wherein the second portion of the first fastener and the second portion of the second fastener each include a respective hook material portion.

* * * * *